(12) United States Patent
Lapinski et al.

(10) Patent No.: US 7,274,996 B2
(45) Date of Patent: Sep. 25, 2007

(54) METHOD AND SYSTEM FOR MONITORING FLUID FLOW

(75) Inventors: Sterling Lapinski, Louisville, KY (US); John Carroll Hill, Pewee Valley, KY (US); Deirdre Alphenaar, Louisville, KY (US)

(73) Assignee: Genscape Intangible Holding, Inc., Louisville, KY (US)

( * ) Notice: Subject to any disclaimer, the term of this patent is extended or adjusted under 35 U.S.C. 154(b) by 222 days.

(21) Appl. No.: 10/967,737

(22) Filed: Oct. 18, 2004

(65) Prior Publication Data

US 2005/0086012 A1 Apr. 21, 2005

Related U.S. Application Data

(60) Provisional application No. 60/512,649, filed on Oct. 20, 2003.

(51) Int. Cl.
G01F 17/00 (2006.01)
G06F 19/00 (2006.01)

(52) U.S. Cl. .......................................... 702/48; 702/54

(58) Field of Classification Search ............... 702/1–14, 702/46–50, 54; 166/53, 249; 340/606; 73/861.25
See application file for complete search history.

(56) References Cited

U.S. PATENT DOCUMENTS

| | | | |
|---|---|---|---|
| 2,936,619 A | 7/1958 | Gibney | |
| 3,580,092 A | 5/1971 | Scarpa | |
| 3,844,170 A | 10/1974 | Critten | |
| 3,845,660 A | 11/1974 | McDonnell | |
| 3,940,985 A | 3/1976 | Wyler | |
| 3,958,458 A | 5/1976 | Foreman et al. | |
| 4,402,230 A | 9/1983 | Raptis | |
| 4,527,432 A | 7/1985 | Gutterman | |
| 4,550,615 A | 11/1985 | Grant | |
| 4,572,003 A | 2/1986 | Fritz | |
| 4,604,904 A | 8/1986 | Massen | |
| 4,607,254 A | 8/1986 | Carlson | |
| 4,708,021 A | 11/1987 | Braun et al. | |
| 4,796,466 A * | 1/1989 | Farmer | 73/40.5 R |
| 4,976,154 A | 12/1990 | Schneider et al. | |
| 5,392,645 A | 2/1995 | Kleppe | |
| 5,416,724 A | 5/1995 | Savic | |
| 5,675,071 A | 10/1997 | Cody et al. | |
| 5,770,806 A | 6/1998 | Hiismaki | |
| 5,941,305 A * | 8/1999 | Thrasher et al. | 166/53 |

(Continued)

OTHER PUBLICATIONS

Robert P. Evans et al., Flow Rate Measurements Using Flow-Induced Pipe Vibration, Journal of Fluid Engineering, Mar. 2004, pp. 280-285, vol. 126.

*Primary Examiner*—Bryan Bui
*Assistant Examiner*—Victor J. Taylor
(74) *Attorney, Agent, or Firm*—Stites & Harbison, PLLC; David W. Nagle, Jr.

(57) ABSTRACT

A method and system for monitoring fluid flow, such as fluid flow through pipelines or similar conduits for delivering natural gas, crude oil, and other similar liquid or gas energy commodities, relies on the measurement of acoustic waves generated by the fluid, thus allowing for monitoring of the flow rate without direct access to the fluid. Furthermore, the method and system allows for estimation of the operational dynamics of components or facilities of the production, transportation, storage, and distribution systems for the energy commodities.

21 Claims, 8 Drawing Sheets

U.S. PATENT DOCUMENTS

| | | |
|---|---|---|
| 5,974,862 A * | 11/1999 | Lander et al. ........... 73/40.5 A |
| 6,035,240 A | 3/2000 | Moorehead et al. |
| 6,236,894 B1 | 5/2001 | Stoisits et al. |
| 6,397,683 B1 | 6/2002 | Hagenmeyer et al. |
| 6,412,352 B1 | 7/2002 | Evans et al. |
| 6,453,247 B1 | 9/2002 | Hunaidi |
| 6,480,793 B1 | 11/2002 | Martin |
| 6,609,069 B2 | 8/2003 | Gysling |
| 6,758,100 B2 * | 7/2004 | Huang ..................... 73/861.25 |
| 6,995,677 B2 * | 2/2006 | Aronstam et al. .......... 340/606 |
| 2003/0131667 A1 | 7/2003 | Gallagher |
| 2005/0189108 A1 * | 9/2005 | Davidson .................... 166/249 |

* cited by examiner

METHOD AND SYSTEM FOR MONITORING FLUID FLOW

CROSS-REFERENCE TO RELATED APPLICATIONS

The present application claims priority to U.S. Provisional Application Ser. No. 60/512,649 filed Oct. 20, 2003, the entire disclosure of which is incorporated herein by reference.

BACKGROUND OF THE INVENTION

The present invention relates to a method and system for monitoring fluid flow, such as fluid flow through pipelines or similar conduits for delivering natural gas, crude oil, and other liquid or gas energy commodities. The method and system relies on the measurement of acoustic waves generated by the fluid, thus allowing for monitoring of the flow rate without direct access to the fluid.

Natural gas, crude oil, and other similar liquid or gas energy commodities comprise a multi-billion dollar economic market. These commodities are bought and sold by many parties, and as with any traded market, information about the traded commodities is very valuable to market participants. Specifically, the operations of the various components and facilities of the production, transportation, storage, and distribution systems for each of these commodities can have significant impacts on the price and availability of these commodities, making information about said operations valuable. Furthermore, such information generally is not disclosed publicly by the various component owners or operators, and access to said information is therefore limited.

It would therefore be desirable to provide a method and system for monitoring fluid flow through pipelines or similar conduits for delivering natural gas, crude oil, and other similar liquid or gas energy commodities, such that information about such commodities can be accumulated and communicated to market participants and other interested parties.

SUMMARY OF THE INVENTION

The present invention is a method and system for monitoring fluid flow, such as fluid flow through pipelines or similar conduits for delivering natural gas, crude oil, and other similar liquid or gas energy commodities. The method and system relies on the measurement of acoustic waves generated by the fluid from a location external to the conduit in which the fluid is flowing, thus allowing for monitoring of the flow rate without direct access to the fluid. Furthermore, the method and system of the present invention allows for estimation of the operational dynamics of components or facilities of the production, transportation, storage, and distribution systems for the energy commodities.

A general property of fluids (whether compressible or incompressible) flowing through pipes or similar conduits is that they produce acoustic waves, i.e., sound or vibration. The sound produced by the flow of natural gas or other energy commodity can be characterized by its amplitude and frequency. In this regard, the amplitude and frequency are generally directly related to the velocity of the fluid through the conduit, and thus the flow rate of the fluid. Therefore, a sound transducer or similar sensor can be positioned to detect the acoustic waves emanating from a particular conduit caused by fluid flow through that conduit, and by recording and analyzing the acoustic waves, the flow rate through the conduit can be estimated. In this regard, the flow rate is commonly expressed as a volumetric flow rate, i.e., characterized as the volume of fluid passing by a designated point over a predetermined time period.

One or more sound transducers are positioned in proximity to a pipeline such that acoustic waves can be reliably detected. Each sound transducer detects the amplitude and/or frequency of the acoustic waves generated by the gas flow through the pipeline and generates a signal representative of that measurement. The signal generated by each sound transducer is transmitted to an above-ground monitoring device in general proximity to the sound transducers and the monitored pipeline. The monitoring device houses the various electronic equipment necessary to process the signals from the sound transducers and transmit collected data to a central processing facility. Specifically, the monitoring device is programmed such that it periodically or continuously collects data from the sound transducers, processes that data into a form suitable for transmission, and transmits the data to a remote central processing facility.

At the central processing facility, a computational analysis is performed by a digital computer program to determine the flow rate of the fluid through the monitored pipeline. Furthermore, for any particular facility or other component of the production, transportation, storage, and/or distribution system for which all, or most of, the connected pipelines are monitored in accordance with the present invention, through a simple summing of the volumetric flow rates on each pipeline, the output or production of the facility can be determined. Then, information associated with the production or output of one or more facilities or components can then be communicated to third parties. This information may include not only the measured flow rates or output estimates, but also historical data, capacity estimates, or similar data that places the measured flow rates or output estimates in context for market participants and other interested parties. It is contemplated and preferred that such communication to third parties be through export of the data to an access-controlled Internet web site, which end users can access through a common Internet browser program.

DETAILED DESCRIPTION OF THE INVENTION

The present invention is a method and system for monitoring fluid flow, such as fluid flow through pipelines or similar conduits for delivering natural gas, crude oil, and other similar liquid or gas energy commodities. The method and system relies on the measurement of acoustic waves generated by the fluid from a location external to the conduit in which the fluid is flowing, thus allowing for monitoring of the flow rate without direct access to the fluid. Furthermore, the method and system of the present invention allows for estimation of the production or output of components or facilities of the production, transportation, storage, and distribution systems for the energy commodities. For purposes of the present application, the production, output, and/or other measure of the flow of an energy commodity through or relative to a component or facility may be referred to as the "operational dynamics" of that component or facility.

To accomplish this, it is first important to recognize that the production, transportation, storage and distribution of liquid or gas energy commodities occurs most often through networks of pipelines. These pipelines connect various system components, such as production wells, storage facilities of various types, and distribution networks comprised of ever-smaller pipelines.

Figure 1:
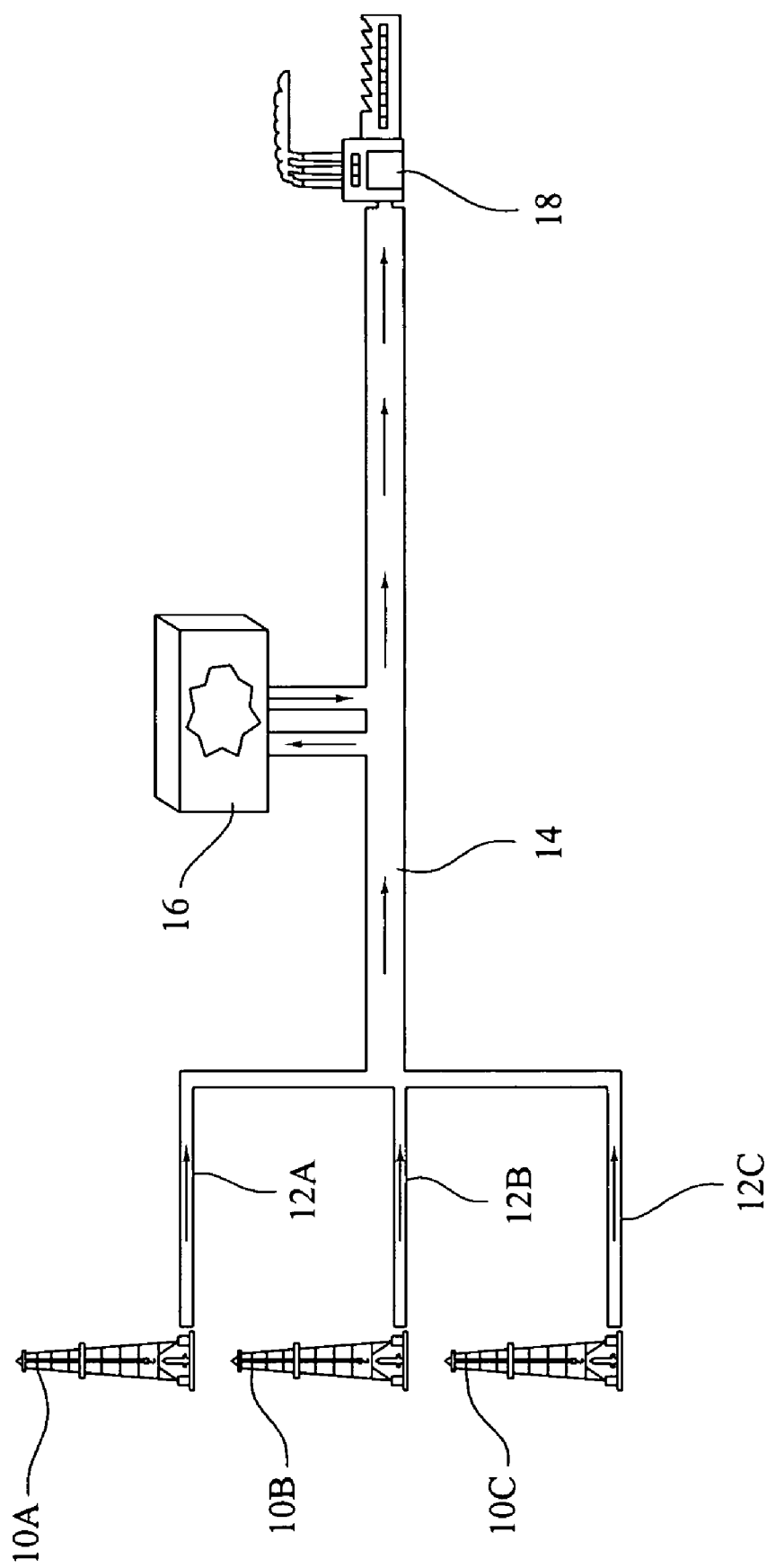
FIG. 1 is a schematic representation of a natural gas system.

For example, with respect to the natural gas industry and as illustrated in FIG. 1, natural gas is located and collected by production companies from geographically dispersed wells, which are generally indicated by reference numerals 10A, 10B, and 10C in FIG. 1. The natural gas collected from these wells is delivered through a network of pipelines (or similar conduits) 12A, 12B, 12C to a primary trunk line 14. From such a trunk line 14, the natural gas is delivered to storage facilities 16, which are typically depleted natural gas fields, salt domes, or similar underground structures; and/or to local distribution companies 18, which in turn, sell and deliver the natural gas to industrial, commercial, and residential end users for ultimate consumption.

In any event, a general property of fluids flowing through pipes or similar conduits is that they produce acoustic waves, i.e., sound or vibration. The sound produced by the flow of natural gas or other energy commodity can be characterized by its amplitude and frequency. In this regard, the amplitude and frequency are generally directly related to the velocity of the flow, and thus the flow rate of the fluid. Furthermore, for compressible fluids, the amplitude and frequency are also generally directly related to the density of the fluid, and thus the volumetric flow rate of the fluid. Therefore, a sound transducer or similar sensor can be positioned to detect the acoustic waves emanating from a particular conduit caused by fluid flow through that conduit. By recording and analyzing the acoustic waves, the flow rate through the conduit can be estimated. As mentioned above, the flow rate is commonly expressed as a volumetric flow rate, i.e., characterized as the volume of fluid passing by a designated point over a predetermined time period.

Figure 2:
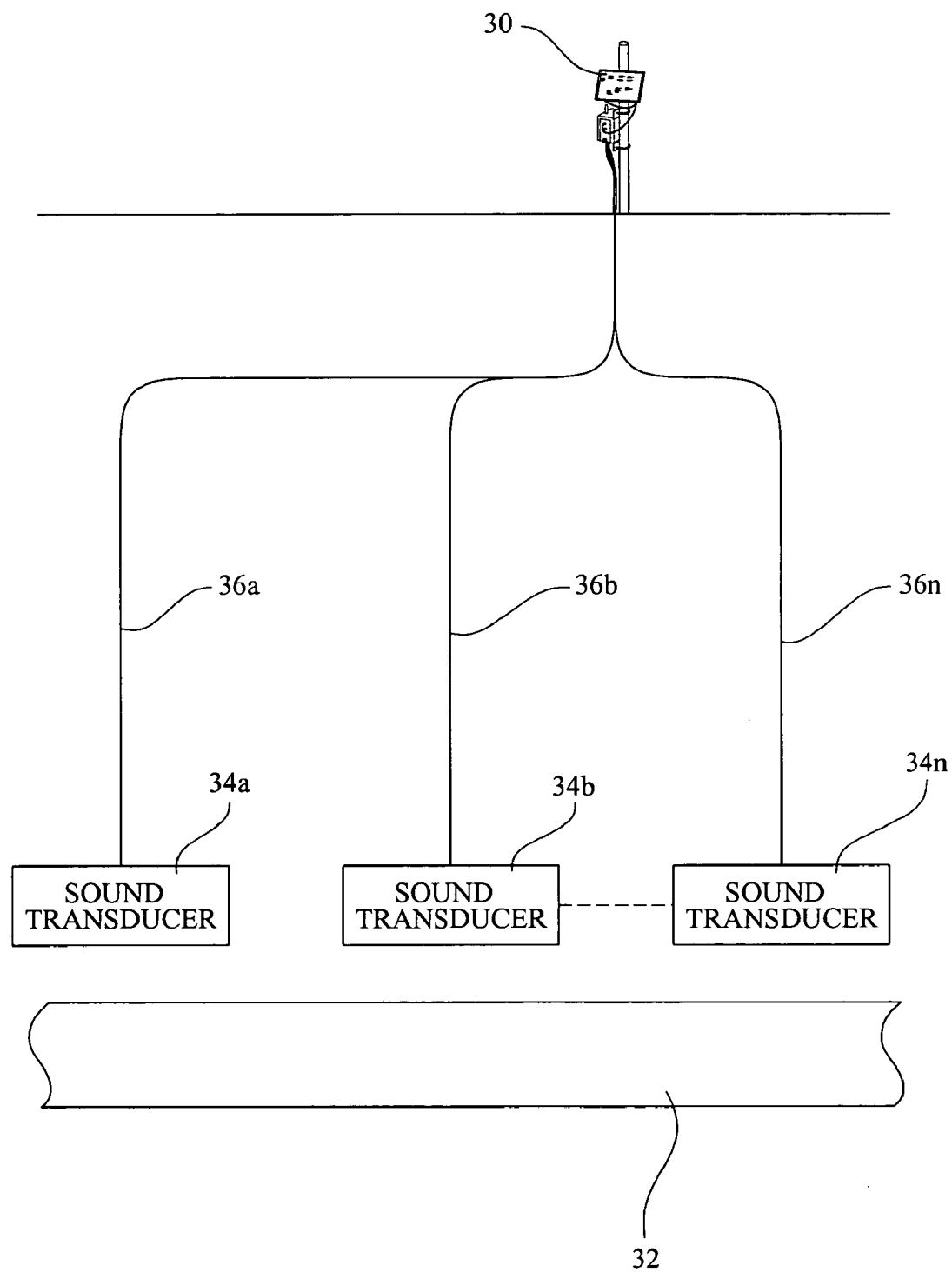
FIG. 2 is a schematic representation of an exemplary implementation of the method and system of the present invention.

FIG. 2 is a schematic representation of an exemplary implementation of the method and system of the present invention. In this example, an underground pipeline 32 is monitored.

Accordingly, one or more sound transducers 34a, 34b . . . 34n (also referred to as acoustic sensors or gas sensors) are positioned in proximity to the pipeline 32, that is, in physical contact with the pipeline 32 or sufficiently close to said pipeline 32 such that acoustic waves can be reliably detected. In this regard, multiple sensors are often preferable to provide multiple measurements at locations along the pipeline 32, which can then be averaged to reduce error. It is contemplated that various commercially available transducers or sensors could be used to achieve the objectives of the present invention. For example, one preferred sound transducer suitable for the purposes of the present invention is a seismic, high-sensitivity accelerometer manufactured and distributed by PCB Piezotronics, Inc. of Depew, New York as Model No. 393B12.

As mentioned above, the sound transducers 34a, 34b . . . 34n are positioned in contact with the pipeline 32 or sufficiently close to said pipeline 32 such that acoustic waves can be reliably detected. For example, many commercially available transducers supply mounting magnets for direct attachment of the transducers to a pipeline or similar conduit. Alternatively, when no such magnet is provided, each sound transducer 34a, 34b . . . 34n may be mounted to the pipeline 32 by attaching a substantially flat magnet to the transducer using an adhesive material, with the magnet then being used to secure the sound transducer 34a, 34b . . . 34n to the pipeline 32. In this regard, each sound transducer 34a, 34b . . . 34n could be provided with a curved magnet that better matches the contour of the pipeline to which it is secured. Furthermore, various adhesives could be used to secure each sound transducer 34a, 34b . . . 34n directly to the pipeline 32. Finally, in circumstances where physical access to the pipeline 32 is not possible or is impractical, the sound transducers 34a, 34b . . . 34n may be mounted on a bracket or similar frame that maintains the position of the sound transducers 34a, 34b . . . 34n relative to the pipeline 32 without necessarily contacting the pipeline 32.

Figure 3:
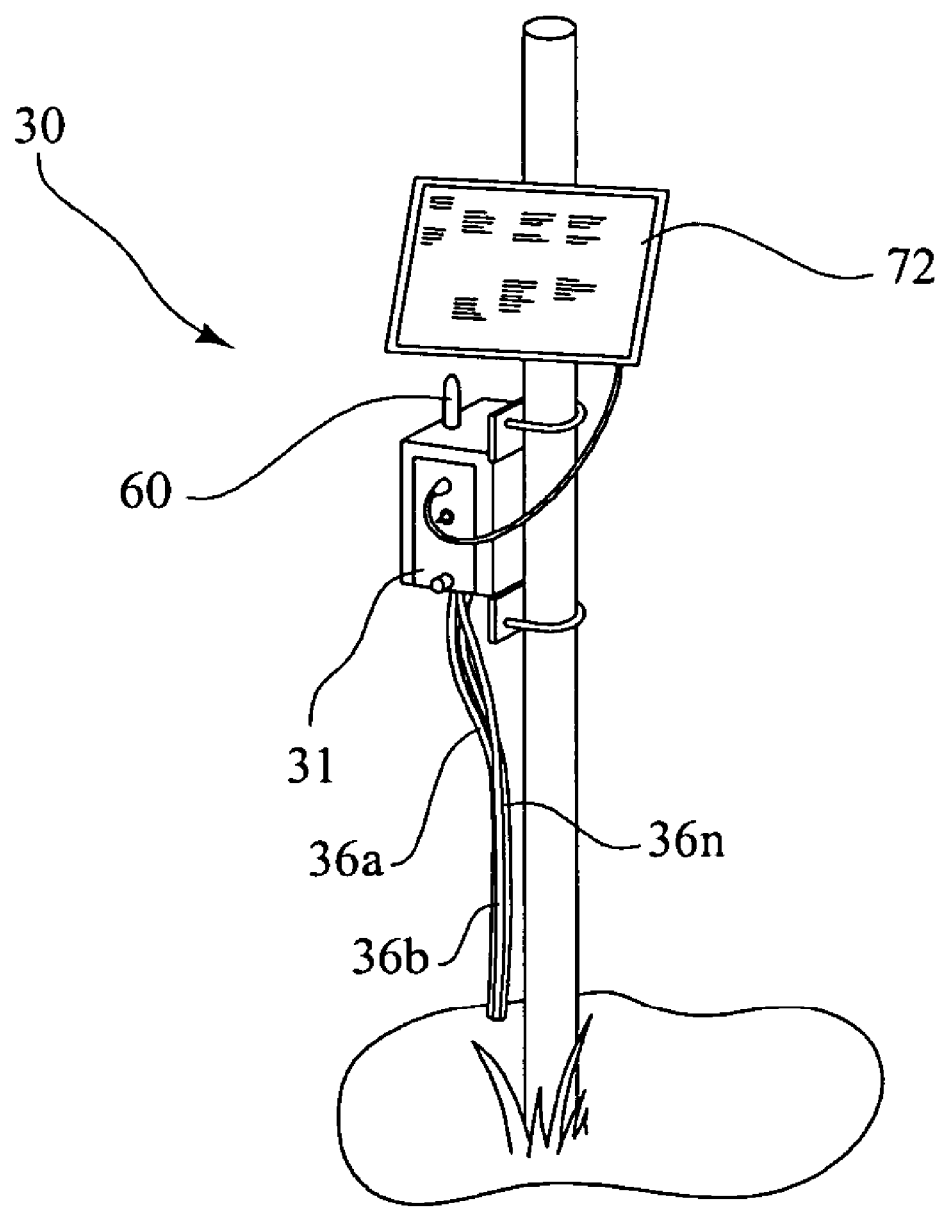
FIG. 3 is a perspective view of an exemplary monitoring device made in accordance with the present invention.

In any event, in this example, each sound transducer 34 detects the amplitude of the acoustic waves generated by the gas flow through the pipeline 32 and generates a signal representative of that amplitude. The signal generated by each sound transducer 34a, 34b . . . 34n is transmitted via an appropriate cable 36a, 36b . . . 36n to an above-ground monitoring device 30, which is preferably "local" in that it is located in general proximity to the sound transducers 34a, 34b . . . 34n and the pipeline 32. As illustrated in FIG. 3, an exemplary monitoring device 30 includes a substantially weatherproof enclosure 31 that is secured to a post and houses the various electronic equipment necessary to process the signals from the sound transducers 34a, 34b . . . 34n and to transmit collected data to a central processing facility, as is further described below.

Figure 4:
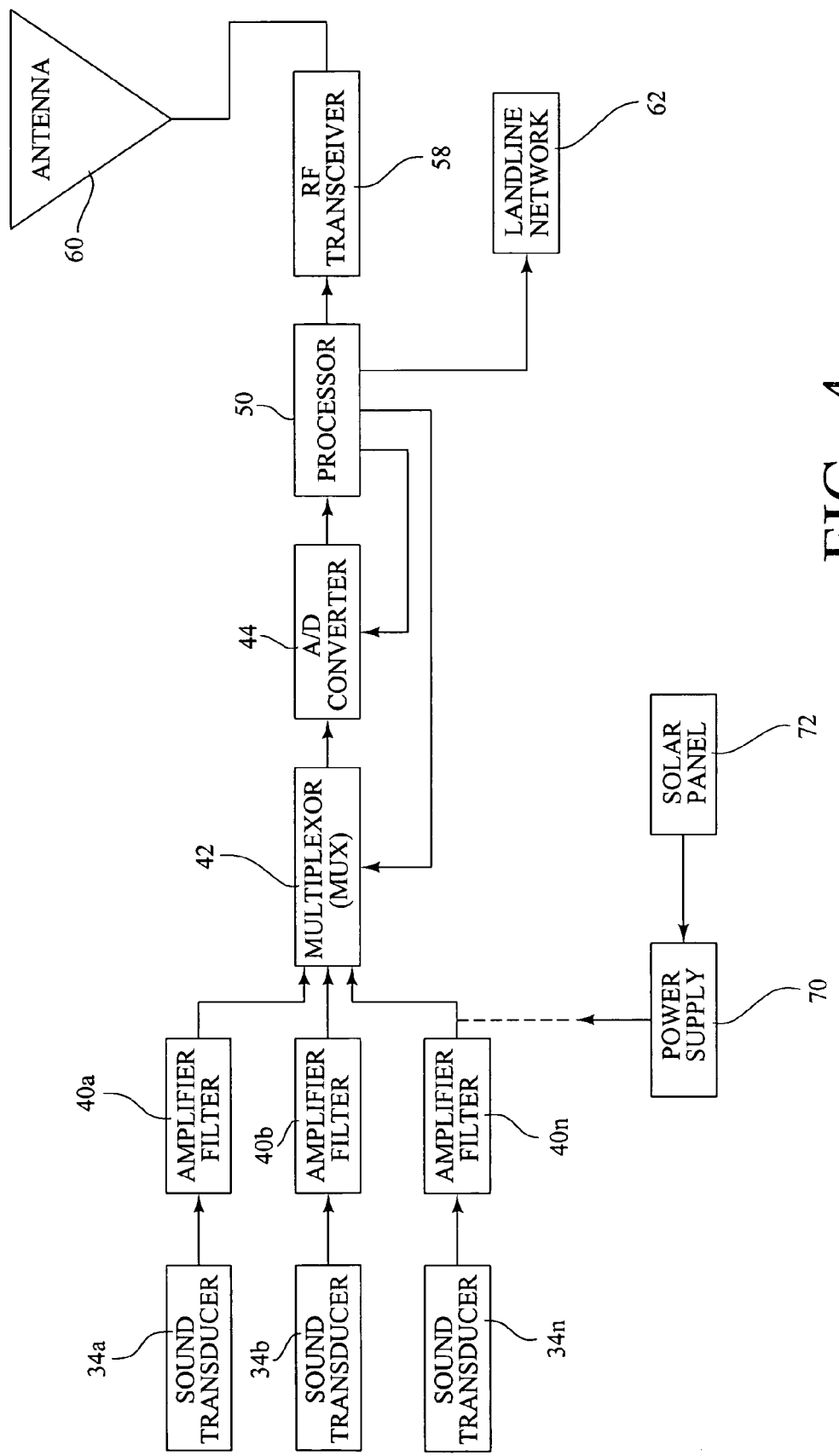
FIG. 4 is a functional block diagram of the sound transducers and the monitoring device in an exemplary implementation of the method and system of the present invention.

FIG. 4 is a functional block diagram of the sound transducers 34a, 34b . . . 34n and the monitoring device 30. As shown, the monitoring device 30 is programmed such that it periodically or continuously collects data from the sound transducers 34a, 34b . . . 34n, processes that data into a form suitable for transmission, and transmits the data to a remote central processing facility where various computational analyses are performed on the data to determine the flow rate of natural gas or other energy commodity through the monitored pipeline.

Specifically, the output voltage of the first sound transducer 34a is applied to a amplification and filtration circuit 40a, which has a dual function. One function of the amplification and filtration circuit 40a is to amplify the relatively small output voltage of the sound transducer 34a to a level that will be suitable as an input to an analog-to-digital converter. The secondary function of the circuit 40a is to serve as a filter, removing extraneous noise from the output voltage of each sound transducer 34a. Similarly, the output voltage of the second sound transducer 34b is applied to another amplification and filtration circuit 40b to amplify the voltage and remove extraneous noise, and so on. The specific design of the amplification and filtration circuits 40a, 40b . . . 40n is immaterial, and various amplification and filtration circuits could be designed to achieve the dual objectives of amplifying the voltage and removing extraneous noise by one of ordinary skill in the art.

After the amplification and filtration of the respective signals, the output voltages are then applied to the inputs of an analog multiplexer (MUX) 42. Furthermore, although not shown in FIG. 4, it may be advisable to apply the output voltages of the respective amplification and filtration circuits 40a, 40b . . . 40n to the inputs of respective sample-and-hold amplifiers before such output voltages are applied to the MUX 42 in order to avoid time-skew in the subsequent conversion of these signals from analog to digital form. Sample-and-hold amplifiers are generally known in the art, and any conventional means for performing the sample-and-hold function maybe incorporated into the present invention as contemplated herein.

From the MUX 42, the signals are separately passed through an analog-to-digital (A/D) converter 44. Which of the multiple signals is passed through to the analog-to-digital converter 44 at any given time is determined by a control logic associated with a microprocessor 50. The converted data, representative of the amplitude of the measured acoustic waves and now in digital form, is stored in memory associated with the microprocessor 50. The outputted signal from the microprocessor 50 is then transmitted to one or both of a radio frequency (RF) transceiver 58 with associated transmission antenna 60 (which is also shown in FIG. 3) and a landline network 62 for subsequent transmission of the signal to a central processing facility.

Finally, the individual electronic components of the monitoring device 30 are preferably powered by a battery 70 that may be continuously recharged by a solar panel array 72 (which is also shown in FIG. 3).

Figure 5:
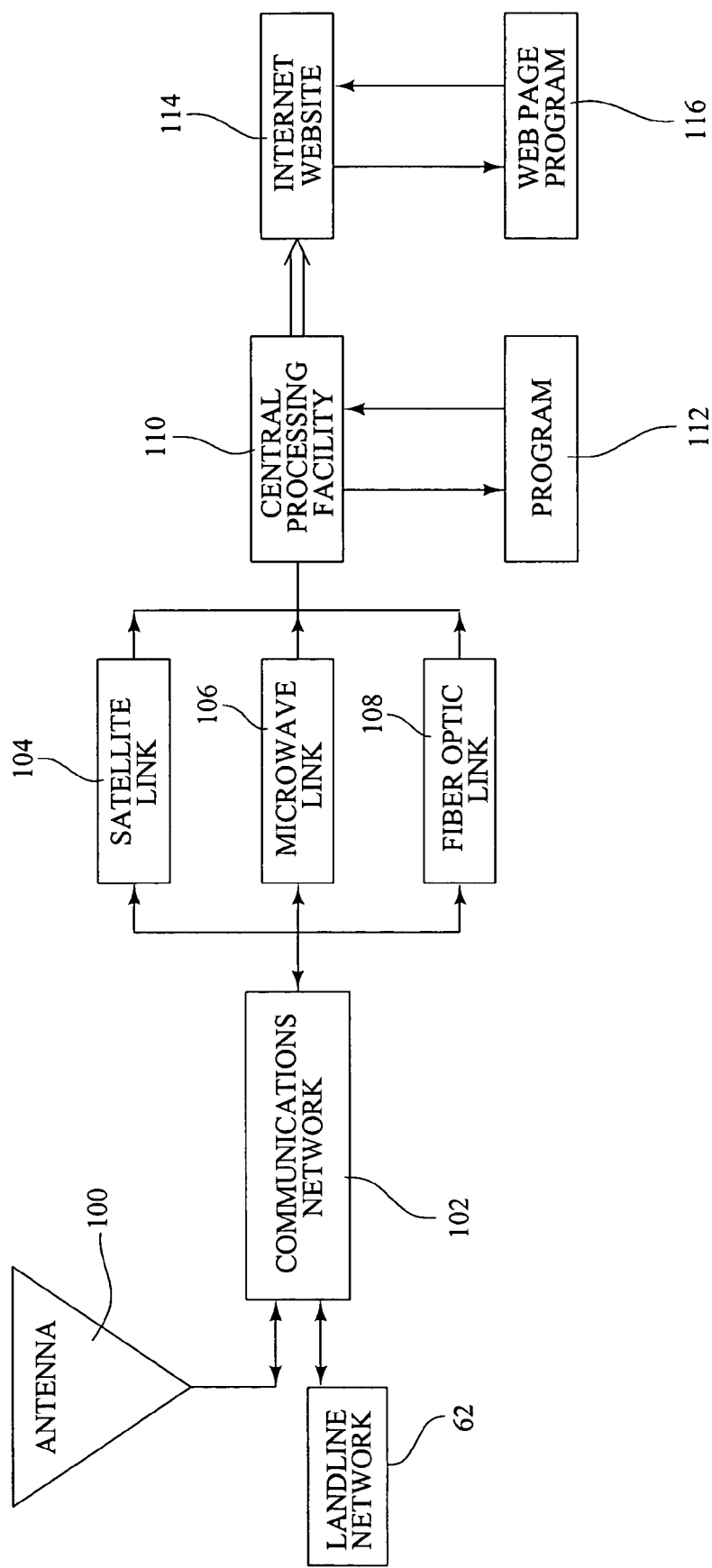
FIG. 5 is a functional block diagram of the communication components and the central processing facility in an exemplary implementation of the method and system of the present invention.
Figure 6:
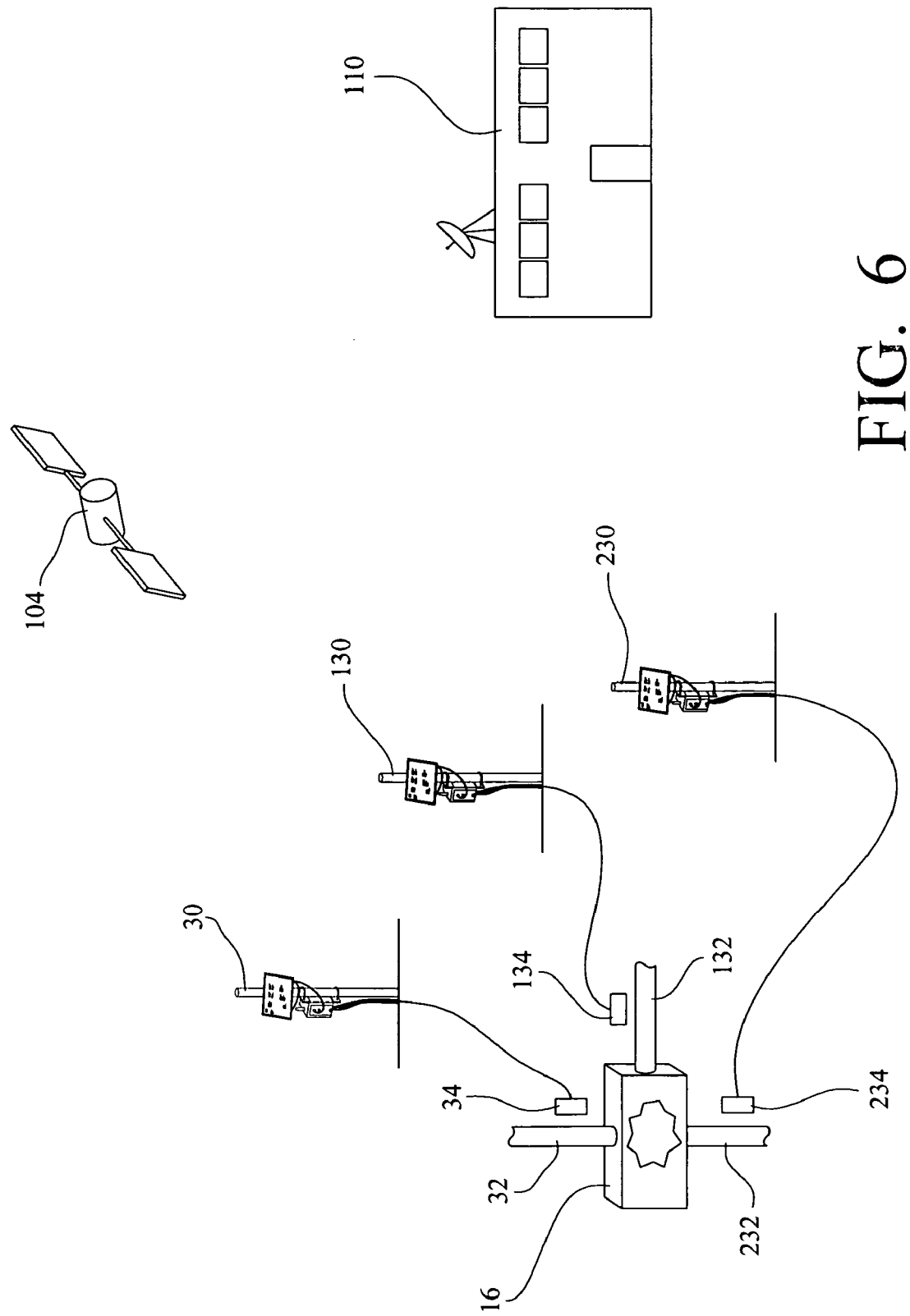
FIG. 6 illustrates the monitoring of a storage facility to which three pipelines are connected in accordance with the method and system of the present invention.

FIG. 5 is a functional block diagram of the communication components and the central processing facility in this exemplary implementation of the method and system of the present invention. These components are not installed in the field with the monitoring device 30, but rather are located at some remote location. Specifically, the outputted data from the microprocessor 50 depicted in FIG. 3 is transmitted to the central processing facility via one or both of a radio frequency (RF) transceiver 58 with associated transmission antenna 60 and a landline network 62. A receiving antenna 100 or similar communication component, which is in range of one or more monitoring devices 30 in the field, receives this data, which is representative of the acoustic measurements. The receiving antenna 100 is operably connected to an analog or digital communications network 102 which transmits the signal to the central processing facility 110. Such transmission may be carried out, for example, by a satellite link 104, a microwave link 106, and/or a fiber optic link 108, although other data transmission means may certainly be used without departing from the spirit and scope of the present invention.

At the central processing facility 110, a computational analysis, as will be described in detail below, is performed by a digital computer program 112 to determine the flow rate of the gas (or similar fluid) through the pipeline 32. Furthermore, for any particular natural gas facility or other component of the production, transportation, storage, and/or distribution system for which all, or most of, the connected pipelines are monitored in accordance with the present invention, through a simple summing of the flow rates on each pipeline, the natural gas production of the facility can be determined. Then, information associated with the production or output of one or more facilities or components can then be communicated to third parties. This information may include not only the measured flow rates or output estimates, but also historical data, capacity estimates, or similar data that places the measured flow rates or output estimates in context for market participants and other interested parties. It is contemplated and preferred that such communication to third parties be through export of the data to an access-controlled Internet web site 114, which end users can access through a common Internet browser program 116, such as Microsoft Internet Explorer®. Of course, communication of information and data to third parties may also be accomplished through a wide variety of other known communications media without departing from the spirit and scope of the present invention.

As an additional refinement, the communications channel from the microprocessor 50 of the local monitoring device 30 to the central processing facility 110 may be bi-directional so that the information maintained and stored in the microprocessor 50 may be sent out on a scheduled basis or may be polled. Furthermore, through bi-directional communications, the microprocessor 50 is remotely re-programmable.

With respect to the computational analysis mentioned above, the relationship of the measured acoustic waves through a conduit to the flow rate is somewhat mathematically complex because the acoustic waves may result not only from fluid flow, but also from the interaction of the fluid with mechanical components of the pipeline, including compressors, gas flow meters, flow and pressure regulators, control valves and/or similar equipment connected to and/or external to the pipeline. However, in circumstances where the interaction of such components or equipment is independent of changing conditions in the fluid itself, the amplitude of the acoustic waves generally increases with increases in the flow rate. For further details and discussion of the sources of noise and the levels of noise produced in gas pipelines, reference is made to Nelson, D. A.; and Cooper, B. A.: Reduced-Noise Gas Flow Design Guide for NASA Glenn Research Center, Proceedings of InterNoise 99, the International Congress on Noise Control Engineering. Institute of Noise Control Engineering (Washington, DC, 1999), a publication which is incorporated herein by reference.

Accordingly, by selecting an appropriate location along a pipeline, a location where interaction of the fluid with other components or equipment is minimal, through comparison of measured acoustic waves to known flow rates, a mathematical relationship suitable for prediction of flow rate can be developed.

Figure 7:
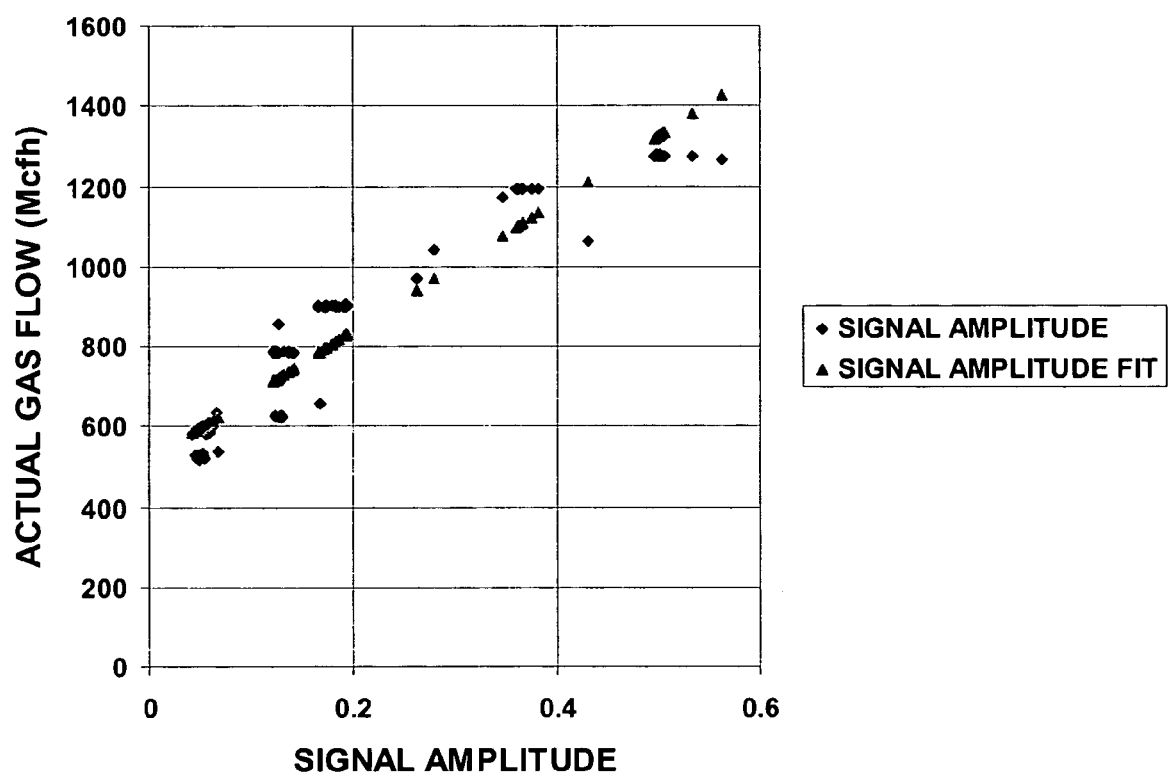
FIG. 7 is a graph illustrating the measured signal amplitudes from a sound transducer positioned adjacent a particular conduit for a defined time period, such that a best fit equation can be developed for subsequent measurements of flow rate through this particular conduit.

For example, FIG. 7 is a graph illustrating the measured signal amplitudes from a sound transducer positioned adjacent a particular conduit for more than a 105-hour time period. During this time period, the actual gas flow was also monitored. Applying a linear regression analysis to this data set, a mathematical relationship was developed, specifically:

$$\text{Estimated Flow } (Mcfh) = [K \text{ (Signal Amplitude)} + C] * 1000 \quad (1)$$

where Mcfh refers to thousand cubic feet per hour, and where K=1.6159 and C=0.5158/

Of course, this mathematical relationship is somewhat unique to the particular conduit. Indeed, the size of the conduit, the characteristics of the specific sound transducers, and environmental conditions may all have an effect on the relationship between measured acoustic waves and flow rate.

Figure 8:
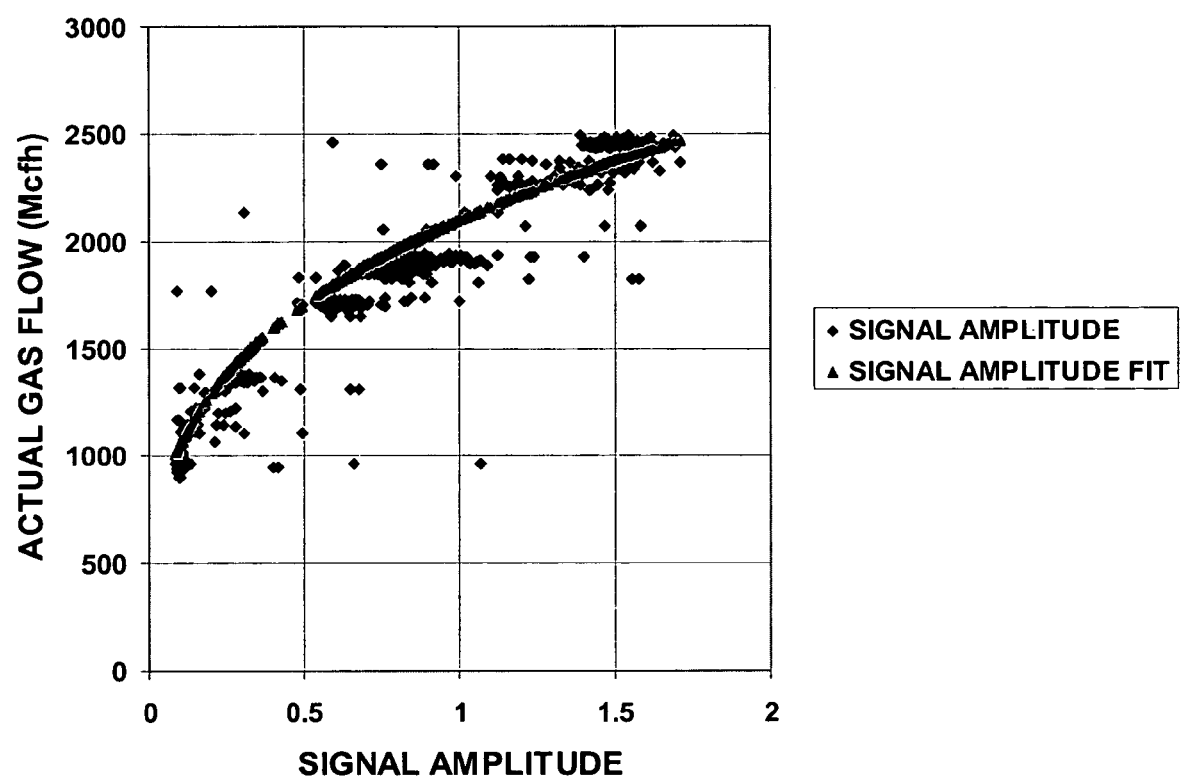
FIG. 8 is a graph illustrating the measured signal amplitudes from a sound transducer positioned adjacent another particular conduit for a defined time period, such that a best fit equation can be developed for subsequent measurements of flow rate through this particular conduit.

For another example, FIG. 8 is a graph illustrating the measured amplitudes from a sound transducer positioned adjacent another conduit for a 180-hour time period. Again, during this time period, the actual gas flow was also monitored. Applying a linear regression analysis to this data set, a mathematical relationship was developed, specifically:

$$\text{Estimated Flow } (mcfh) = K \text{ (Signal Amplitude)}^C \quad (2)$$

where K=2100 and C=0.30

This mathematical relationship is also unique to the particular conduit and environmental conditions. Nonetheless, by developing "best fit" equations for various conduits in various settings, as the above examples demonstrate, when a new conduit is to be monitored, an appropriate equation can be selected based on the size of the conduit, environmental conditions, etc. Furthermore, through data accumulation and analysis, it is expected that additional correlations may be deduced, such as the relationship of the constants K and C to: (1) certain identifiable characteristics of the conduit, such as internal diameter of the conduit and wall thickness of the conduit; (2) characteristics of the fluid, such as temperature, pressure, velocity, etc.; and (3) characteristics associated with different types of nearby mechanical noise sources, such as compressors and control valves. In his regard, for estimates of noise resulting from many such characteristics, reference is again made to Nelson, D. A.; and Cooper, B. A.: Reduced-Noise Gas Flow Design Guide for NASA Glenn Research Center, Proceedings of InterNoise 99, the International Congress on Noise Control Engineering. Institute of Noise Control Engineering (Washington, D.C., 1999), a publication which has been incorporated herein by reference.

In any event, once the appropriate mathematical relationship has been developed, a particular conduit can be monitored in substantially real-time. Once the digitized data associated with the monitoring of that particular conduit is received at the central processing facility, the necessary computational analysis is carried out, preferably by a digital computer program, to determine the flow rate of the gas (or similar fluid) through the conduit.

As mentioned above, through such computations, the method and system of the present invention allows for estimation of the operational dynamics of components or facilities of the production, transportation, storage, and distribution systems for the energy commodities. For example, in the natural gas industry, storage facilities receive and store gas collected by production companies during periods of lower usage (i.e., the summer months) and then distribute stored gas to local distribution companies during periods of high usage (i.e., the winter months), as generally described above with reference to FIG. 1. Of course, gas is transported into and out of such storage facilities through a number of pipelines. Through an estimation of the amount of gas flowing through each pipeline as described above, coupled with a knowledge of the direction of flow through each pipeline, through a simple summing of the flow rates on each pipeline, the net injection or withdrawal of gas for a particular storage facility can be determined. Then, as also described above, this estimate can be communicated to third parties through an access-controlled Internet web site or otherwise.

FIG. 7 illustrates such an estimate of the output of a storage facility 16 to which three pipelines 32, 132, 232 are connected. Each such pipeline 32, 132, 232 is monitored by a package of one or more sound transducers 34, 134, 234 and associated monitoring devices 30, 130, 230. Data collected and processed by each monitoring device 30, 130, 230 is transmitted via a satellite link 104 to a central processing facility 110, where, through a simple summing of the computed flow rates on each pipeline 32, 132, 232, the net injection or withdrawal of gas for the storage facility 16 can be determined.

With respect to the direction of flow through each pipeline associated with a facility, various techniques can be used to deduce the direction of flow. For example, pipeline networks at storage facilities includes similar mechanical components and structures, with the function of these components and structures often being dependent on the direction of flow through the pipeline. Accordingly, an evaluation of the physical layout of the pipeline networks may provide some indication of the direction of flow. Furthermore, an analysis of the measured acoustic waves may provide an indication of the direction of flow in that certain mechanical components may be activated when gas flow is in a certain direction (e.g., a compressor for injection of gas into the storage facility). For another example, the knowledge of the seasonal operation of the storage facility, as mentioned above, may be used to deduce the direction of flow. Regardless of the technique used, the net injection or withdrawal of gas for a particular storage facility can thus be determined.

One of ordinary skill in the art will recognize that additional embodiments and/or implementations are possible without departing from the teachings of the present invention or the scope of the claims which follow. This detailed description, and particularly the specific details of the exemplary implementation disclosed therein, is given primarily for clarity of understanding, and no unnecessary limitations are to be understood therefrom, for modifications will become obvious to those skilled in the art upon reading this disclosure and may be made without departing from the spirit or scope of the claimed invention.

What is claimed is:

1. A method for providing information relating to fluid flow rate through a conduit to a remote third party, comprising the steps of:
   - positioning one or more sound transducers in proximity to and external to said conduit, each said sound transducer generating a signal representative of acoustic waves generated by the fluid flow through said conduit;
   - collecting said signals from said one or more sound transducers on a substantially continuous basis;
   - processing said signals to determine the flow rate through the conduit; and
   - communicating information relating to the flow rate to said remote third party.

2. The method as recited in claim 1, in which signals generated by said one or more sound transducers are received and collected by a local monitoring device and then transmitted from the local monitoring device to a remote central processing facility for processing said signals to determine the flow rate through the conduit.

3. The method as recited in claim 1, in which said one or more sound transducers are near, but not in physical contact with, said conduit.

4. The method as recited in claim 1, in which communicating information relating to the flow rate to said remote third party is accomplished through export of such information to an Internet web site accessible by said third party.

5. A method for monitoring fluid flow through a conduit and communicating a flow rate to a third party, comprising the steps of:
   positioning one or more sound transducers in proximity to and external to said conduit, each said sound transducer generating a signal representative of a measured amplitude of acoustic waves generated by the fluid flow through said conduit;
   receiving such acoustic signals and processing the signals into digitized data representative of the measured amplitude on a substantially continuous basis;
   performing a computational analysis on the digitized data to determine the flow rate through said conduit based on the measured amplitude; and
   communicating the flow rate to said third party.

6. The method as recited in claim 5, wherein the receiving and processing of the signals into digitized data representative of the measured amplitude is carried out by a monitoring device in general proximity to the sound transducers.

7. The method as recited in claim 6, and further comprising the step of transmitting the digitized data from the monitoring device to a central processing facility for performing the computational analysis on the digitized data to determine the flow rate through said conduit.

8. The method as recited in claim 6, wherein the monitoring device includes one or more amplification and filtration circuits for amplifying the signal from each sound transducer and for removing extraneous noise prior to the processing of the signals into digitized data representative of the measured amplitude.

9. The method as recited in claim 6, in which the monitoring device is powered by a battery that is continuously recharged by a solar panel array.

10. The method as recited in claim 7, in which transmitting the digitized data is accomplished by a radio frequency transceiver associated with the monitoring device.

11. The method as recited in claim 5, in which communicating the flow rate to said third party is accomplished through export of the flow rate to an Internet web site accessible by said third party.

12. A method for monitoring fluid flow through a conduit and communicating a flow rate to a third party, comprising the steps of:
   detecting an amplitude of acoustic waves generated by fluid flow through said conduit;
   generating a signal representative of the detected amplitude;
   transmitting the signal representative of the detected amplitude to a monitoring device on a substantially continuous basis;
   processing the signal into digitized data representative of the measured amplitude;
   performing a computational analysis on the digitized data to determine the flow rate through said conduit based on the measured amplitude; and
   communicating the flow rate to said third party.

13. The method as recited in claim 12, in which communicating the flow rate to said third party is accomplished through export of the flow rate to an Internet web site accessible by said third party.

14. A method for estimating operational dynamics of a facility, comprising the steps of:
   positioning at least one monitoring device in proximity to and external to each of a number of selected conduits of the facility, each such monitoring device including at least one sound transducer for generating a signal representative of acoustic waves generated by the flow of an energy commodity through each selected conduit;
   each monitoring device receiving such signals on a substantially continuous basis and processing the signals into digitized data representative of the acoustic waves;
   processing the digitized data to determine a flow rate of the energy commodity through each selected conduit;
   estimating the operational dynamics of the facility based on the determined flow rates; and
   communicating information related to the operational dynamics of the facility to a third party.

15. The method as recited in claim 14, in which each monitoring device transmits digitized data representative of the acoustic waves to a remote central processing facility for processing the digitized data to determine the flow rate of the energy commodity through each selected conduit and estimating the operational dynamics of the facility based on the determined flow rates.

16. The method as recited in claim 14, in which communicating information related to the operational dynamics of the facility to a third party is accomplished through export of such information to an Internet web site accessible by said third party.

17. A method for estimating fluid flow through a conduit, comprising the steps of:
   positioning one or more sound transducers in proximity to and external to said conduit, each said sound transducer generating a signal representative of a measured amplitude of acoustic waves generated by the fluid flow through said conduit;
   monitoring actual fluid flow through the conduit;
   comparing the measured amplitudes to the actual fluid flow to develop a mathematical relationship between the measured amplitude and the actual fluid flow; and
   using the developed mathematical relationship for future estimates of fluid flow through the conduit or another conduit having similar physical characteristics.

18. A method for providing information relating to fluid flow rate through a conduit to a remote third party in substantially real-time, comprising the steps of:
   positioning one or more sound transducers in proximity to and external to said conduit, each said sound transducer generating a signal representative of acoustic waves generated by the fluid flow through said conduit;
   collecting said signals from said one or more sound transducers on a substantially continuous basis;
   processing said signals to determine the flow rate through the conduit; and
   communicating information relating to the flow rate to said remote third party on a substantially real-time basis.

19. The method as recited in claim 18, in which signals generated by said one or more sound transducers are received and collected by a local monitoring device and then transmitted from the local monitoring device to a remote central processing facility for processing said signals to determine the flow rate through the conduit.

20. The method as recited in claim 18, in which said one or more sound transducers are near, but not in physical contact with, said conduit.

21. The method as recited in claim 18, in which communicating information relating to the flow rate to said remote third party on a substantially real-time basis is accomplished through export of such information to an Internet web site accessible by said third party.

* * * * *